United States Patent
Rao et al.

(10) Patent No.: US 11,418,618 B2
(45) Date of Patent: Aug. 16, 2022

(54) ECO: EDGE-CLOUD OPTIMIZATION OF 5G APPLICATIONS

(71) Applicant: NEC Laboratories America, Inc., Princeton, NJ (US)

(72) Inventors: Kunal Rao, Monroe, NJ (US); Giuseppe Coviello, Princeton, NJ (US); Wang-Pin Hsiung, Santa Clara, CA (US); Srimat Chakradhar, Manalapan, NJ (US)

(73) Assignee: NEC Corporation

( * ) Notice: Subject to any disclaimer, the term of this patent is extended or adjusted under 35 U.S.C. 154(b) by 0 days.

(21) Appl. No.: 17/515,875

(22) Filed: Nov. 1, 2021

(65) Prior Publication Data

US 2022/0150326 A1 May 12, 2022

Related U.S. Application Data

(60) Provisional application No. 63/231,789, filed on Aug. 11, 2021, provisional application No. 63/111,198, filed on Nov. 9, 2020.

(51) Int. Cl.
| | |
|---|---|
| *G06F 15/16* | (2006.01) |
| *H04L 67/62* | (2022.01) |
| *H04L 67/06* | (2022.01) |
| *H04L 67/51* | (2022.01) |

(52) U.S. Cl.
CPC ............ *H04L 67/325* (2013.01); *H04L 67/06* (2013.01); *H04L 67/16* (2013.01)

(58) Field of Classification Search
None
See application file for complete search history.

(56) References Cited

U.S. PATENT DOCUMENTS

| | | | |
|---|---|---|---|
| 8,359,223 B2 | 1/2013 | Chi et al. | |
| 9,164,800 B2 | 10/2015 | Alicherry et al. | |
| 9,207,993 B2 * | 12/2015 | Jain | G06F 9/5094 |
| 9,223,900 B2 | 12/2015 | Jebara et al. | |
| 2013/0060933 A1 * | 3/2013 | Tung | H04L 41/5009 709/224 |
| 2014/0278807 A1 | 9/2014 | Bohacek | |
| 2017/0048308 A1 | 2/2017 | Qaisar | |

* cited by examiner

*Primary Examiner* — Atta Khan
(74) *Attorney, Agent, or Firm* — Joseph Kolodka

(57) ABSTRACT

A method for optimal placement of microservices of a micro-services-based application in a multi-tiered computing network environment employing 5G technology is presented. The method includes accessing a centralized server or cloud to request a set of services to be deployed on a plurality of sensors associated with a plurality of devices, the set of services including launching an application on a device of the plurality of devices, modeling the application as a directed graph with vertices being microservices and edges representing communication between the microservices, assigning each of the vertices of the directed graph with two cost weights, employing an edge monitor (EM), an edge scheduler (ES), an alerts-manager at edge (AM-E), and a file transfer (FT) at the edge to handle partitioning of the microservices, and dynamically mapping the microservices to the edge or the cloud to satisfy application-specific response times.

18 Claims, 8 Drawing Sheets

ECO: EDGE-CLOUD OPTIMIZATION OF 5G APPLICATIONS

RELATED APPLICATION INFORMATION

This application claims priority to Provisional Application No. 63/111,198, filed on Nov. 9, 2020, and Provisional Application No. 63/231,789, filed on Aug. 11, 2021, the contents of both are which are incorporated herein by reference in their entirety.

BACKGROUND

Technical Field

The present invention relates to cloud computing and edge computing, and more particularly, to an edge-cloud optimization framework for 5G applications.

Description of the Related Art

Cloud services are everywhere. From individual users watching video content to enterprises deploying software-as-a-service, cloud services are increasingly how the world consumes content and data. Although centralized cloud computing is ubiquitous, and economically efficient, an exponential growth in internet-connected machines and devices is resulting in emerging new applications, services, and workloads for which the centralized cloud quickly becomes computationally inefficient. New, emerging applications like autonomous driving, smart manufacturing, tactile internet, remote surgeries, real-time closed-loop control as in Industry 4.0, augmented or virtual reality require tens of milliseconds to sub-millisecond response times. For these applications, processing all data in the cloud and returning the results to the end user is not an option because it takes too long, uses excessive power, creates privacy and security vulnerabilities, and causes scalability problems. New applications demand a different kind of computing fabric, one that is distributed and built to support low-latency and high-bandwidth service delivery capability, which centralized cloud implementations with 100+ milliseconds (ms) network latencies are not well-suited for.

SUMMARY

A method for optimal placement of microservices of a micro-services-based application in a multi-tiered computing network environment employing 5G technology is presented. The method includes accessing a centralized server or cloud to request a set of services to be deployed on a plurality of sensors associated with a plurality of devices, the set of services including launching an application on a device of the plurality of devices, modeling the application as a directed graph with vertices being microservices and edges representing communication between the microservices, assigning each of the vertices of the directed graph with two cost weights, the first cost weight representing a cost for running the microservice on the edge and the second cost weight representing a cost for running the microservice on the cloud, employing an edge monitor (EM), an edge scheduler (ES), an alerts-manager at edge (AM-E), and a file transfer (FT) at the edge to handle partitioning of the microservices, and dynamically mapping the microservices to the edge or the cloud to satisfy application-specific response times.

A non-transitory computer-readable storage medium comprising a computer-readable program for optimal placement of microservices of a micro-services-based application in a multi-tiered computing network environment employing 5G technology is presented. The computer-readable program when executed on a computer causes the computer to perform the steps of accessing a centralized server or cloud to request a set of services to be deployed on a plurality of sensors associated with a plurality of devices, the set of services including launching an application on a device of the plurality of devices, modeling the application as a directed graph with vertices being microservices and edges representing communication between the microservices, assigning each of the vertices of the directed graph with two cost weights, the first cost weight representing a cost for running the microservice on the edge and the second cost weight representing a cost for running the microservice on the cloud, employing an edge monitor (EM), an edge scheduler (ES), an alerts-manager at edge (AM-E), and a file transfer (FT) at the edge to handle partitioning of the microservices, and dynamically mapping the microservices to the edge or the cloud to satisfy application-specific response times.

A system for optimal placement of microservices of a micro-services-based application in a multi-tiered computing network environment employing 5G technology is presented. The system includes a memory and one or more processors in communication with the memory configured to access a centralized server or cloud to request a set of services to be deployed on a plurality of sensors associated with a plurality of devices, the set of services including launching an application on a device of the plurality of devices, model the application as a directed graph with vertices being microservices and edges representing communication between the microservices, assign each of the vertices of the directed graph with two cost weights, the first cost weight representing a cost for running the microservice on the edge and the second cost weight representing a cost for running the microservice on the cloud, employ an edge monitor (EM), an edge scheduler (ES), an alerts-manager at edge (AM-E), and a file transfer (FT) at the edge to handle partitioning of the microservices, and dynamically map the microservices to the edge or the cloud to satisfy application-specific response times.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
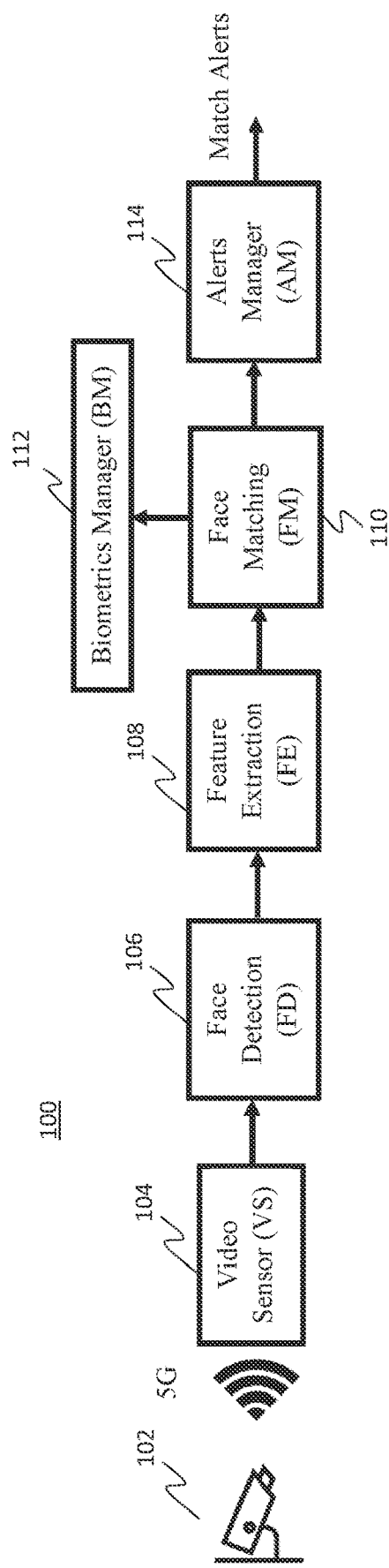
FIG. 1 is a block/flow diagram of an exemplary real-time monitoring and access control application pipeline, in accordance with embodiments of the present invention.

The speed of light places a fundamental limit on network latencies, and the farther the distance between a data source and a processing destination, the more time it will take to transmit the data to the destination. Edge computing places computing resources at the edges of the Internet in close proximity to devices, information sources and end-users, where the content is created and consumed. This, much like a cache on a central processing unit (CPU), increases bandwidth and reduces latency between the end-users or data sources, and data processing. Today, the centralized cloud has more than 10,000 data centers scattered across the globe, but within the next five years, driven by a need to get data and applications closer to end-users (both humans and machines), orders of magnitude more heavily scaled-down data centers are expected to sprout up at the edge of the Internet to form the edge-cloud.

A tiered system with the cloud, and additional, heterogeneous computing and storage resources placed inside or in close proximity to sensors, is emerging as a computing reference architecture for edge-cloud applications. These additional compute or storage resources can be mobile as in a vehicle or smartphone, they can be static as in a manufacturing plant or offshore oil rig, they can be a mixture of the two, as in hospitals, or they can be in a telecommunication provider's data centers at the edges of the cellular network. In all cases, edge resources are expected to be used solely to meet application-specific needs like very short response times, or to do some analysis locally on large sensor data sets that are impractical to send to the cloud due to their high dimensionality or data-rate. The cloud is expected to be used for a fully centralized application delivery, management and execution of select application functions that may require a global perspective.

A tiered reference architecture is attractive for several reasons. First, wireless data rates have increased by four orders of magnitude over the past twenty years, and the push towards new networks like 5G, which promises cellular communications at least an order of magnitude beyond the LTE networks today, can deliver radio access links operating at 1 Gbps or higher, access network latencies reducing from 10s of milliseconds to 1 ms, and device densities as high as a million internet-connected devices in one square kilometer. 5G coupled with computing capability at the edge of the cellular network can enable fundamentally new applications that require high data-rate instantaneous communications, low latency, and massive connectivity. Applications can use a 5G network slice, which is a logical or virtual network over a shared, physical communication network, to address their distinct characteristics and service requirements. For example, a 5G slice that supports a robot automation would differ in terms of throughput, latency and reliability requirements from a 5G slice for a voice phone call. Since individual slices share a finite physical network, ensuring service quality and end-to-end network performance of every slice means that the 5G network may sometimes have to turn down requests for another slice.

Second, by extending the cloud paradigm to the heavily scaled-down edge data centers, it is possible for edge providers to quickly develop, install, deliver and manage applications using the same tools and techniques that are used in the cloud. For example, customers of Amazon Web Services (AWS) Wavelength can deploy parts of their application that require ultra-low latency at the edge of 5G networks using the same AWS APIs, tools, and functionality they use today in the cloud, while seamlessly connecting back to the rest of their application and the full range of cloud services running in an AWS Region.

Third, the cloud can be used for a fully centralized application delivery, and management, in addition to providing computing resources for execution of application functions that require a global perspective.

Despite its promise, and obvious advantages, the tiered reference architecture also poses several fundamental challenges for applications:

First, the complex, tiered distributed architecture entails very high programming complexity. Mapping and execution of applications on a complex edge-cloud geo-spatially distributed infrastructure with heterogeneous resources (different types of networks and computing resources), and at different network hierarchies, to meet low-latency response times is a major challenge. The execution of an edge-cloud application often requires its functions to span across mobile devices, edges, and the distant central cloud, with several stages of computation where data is flowing from one stage to another in a pipeline. Understanding of the concurrency and latency-sensitive pipelines in the application, and subsequent dynamic distribution and parallel execution of these functions in a dynamic heterogeneous environment, are necessary to achieve low latency application response. These concerns are non-trivial and daunting for most application developers to address, and they are almost impossible for any application-agnostic underlying distributed network and computing platforms to handle.

Second, edge resources (compute, storage and network bandwidth) are severely limited and a lot more expensive than cloud resources, and many applications from different users would want to use them. Thus, it is important to use the edge resources very efficiently, and application-specific optimization strategies beyond the efficiencies provided by the underlying compute and network platforms are necessary to realize economically viable low-latency response applications.

Third, temporary network disruptions are unavoidable. Traditional application-agnostic methods like database synchronization of data across different tiers of the distributed infrastructure are too slow (and resource intensive for the resource-constrained edge) to achieve low-latency application response.

Lastly, cloud fault tolerant solutions like active state machine replication, or check-pointing and restarting, are not applicable to failures in the edge-cloud. For real-time applications such as closed-loop industrial control, restarting from past checkpoints may not be appropriate. Instead, lightweight restarts need to be performed from a currently valid, application-specific operating point.

The exemplary embodiments focus on the design and development of edge-cloud applications and introduce a programming model and a run-time that enables applications to make effective use of the large-scale distributed platform including a 5G network, computing and storage resources across the cloud, different tiers of edge-cloud, and the devices. The programming model captures internal knowledge about the application's microservices, their interconnections, and the pipelines of microservices that determine the latency response of the application. The runtime continuously monitors data produced and exchanged among the microservices, dynamically maps the microservices to different tiers of computing and storage resources to achieve application latency goals, maintains data consistency across the distributed storage by using microservice proxies to reduce WAN bandwidth by an order of magnitude, handles temporary network disconnections, all in an application-specific manner by leveraging the knowledge about the application's functions, latency-critical pipelines and intermediate data.

The exemplary embodiments illustrate the use of the proposed programming model, and the new run-time, by successfully mapping two different types of video analytics applications to the AWS/Verizon Wavelength edge-cloud architecture. The proposed approach is just as easily applicable to any application that will be packaged in a 5G network slice.

Regarding microservices, the exemplary methods fragment a single application into a series of smaller services, called microservices, each executing in its own process or container, and interacting with each other by using lightweight communication mechanisms. These microservices are developed around the analytics capabilities of the application. Microservices are increasingly becoming popular, especially in cloud services. Microservices are independently deployable with an automated deployment mechanism, they need a bare minimum of management, they can be built in different programming languages and employ different data storage technologies, and each microservice can be independently updated, replaced and scaled. In contrast, a large monolithic application is hard to comprehend, requires extensive manual testing when code changes are made, and even for a small change, the entire application has to be re-deployed again.

In one example, a real-time monitoring and access control application can have six microservices, and the internal knowledge about the interconnections among the microservices is captured, their input and output data, and the pipelines in the application that determine the overall latency of the application response from measurement to action. Vertices are microservices, and there is a directed edge when the output of a microservice is an input to another service. Applications can have a large number of microservices, with complex interactions, and multiple latency-critical pipelines. However, by representing the application as a directed graph, the exemplary methods can systematically capture the internal knowledge of the application.

The exemplary methods consider two different types of video analytics applications to illustrate the proposed programming model, that is, real-time monitoring and access control, and investigation and forensics.

Regarding real-time monitoring and access control, and specifically with respect to application functionality, a surveillance application is introduced where video cameras are used to monitor and flag undesirable individuals like criminals, or to control access to a particular facility and allow only authorized individuals (say, employees) into the facility. A watchlist, which is a list of people to be monitored or authenticated, is created and registered with the application. Faces of these individuals are enrolled into the watchlist. Using face-recognition technology, a unique signature of the face, which is a facial template, is obtained for each face. This template is subsequently used to match against the live faces captured by a video camera. If a person in the watchlist appears in front of the cameras, an alert is generated in real-time. In case of access control, the alert includes further checks such as checking the identity card of the individual and whether the individual is allowed to enter the facility at the particular time, before granting or denying access. This is a latency-sensitive application, where the alert should be triggered as soon as possible (within milliseconds). For this to happen, the video from the camera needs to be continuously streamed at a very high frame per second (FPS) and triggered alerts need to be received back within milliseconds for further action, e.g., display (e.g., showing on user interface (UI) in control room) or actuation (e.g., opening a gate).

Regarding real-time monitoring and access control, and specifically with respect to applications as microservices, FIG. 1 shows the entire application as a collection of interconnected microservices 100. The Biometrics Manager (BM) microservice 112 manages the watchlist information, including the names and pictures of individuals registered in a watchlist. Video Sensor (VS) microservice 104 receives the video stream 102, decodes it and makes it available as individual frames for further processing. Faces in these frames are then detected by the Face Detection (FD) microservice 106. Once faces are detected, unique facial feature templates are extracted by the Feature Extraction (FE) microservice 108. These feature templates are then matched against the pre-registered individuals' facial feature template by Face Matching (FM) microservice 110. Face Matching service 110 uses the watchlist information from BM microservice 112 for matching the facial templates. Based on the match between these facial templates, an alert is generated which is managed by Alerts Manager (AM) microservice 114. AM microservice 114 has a database to persist the alerts and also makes them available immediately over a ZeroMQ channel, which can be consumed by other applications. ZeroMQ is an asynchronous messaging library, aimed at use in distributed or concurrent applications. ZeroMQ provides a message queue, but unlike message-oriented middleware, a ZeroMQ system can run without a dedicated message broker. The library's API is designed to resemble Berkeley sockets.

FIG. 1 also shows the pipeline of microservices that determine the response latency of the application, from measurement (e.g., capture of a frame by a video camera) to action (e.g., when an alert is produced). As part of the specification of the application, the programming model also knows the acceptable response latencies for the pipelines. It is noted that individual latencies of the microservices do not have to be specified, only the desired aggregate latency of the pipelines.

Regarding investigation and forensics, and specifically with respect to application functionality, in contrast to the real-time monitoring application, where a live video stream is being used for real-time analytics, in a forensics application, archived video files are used for investigation purposes. This application is required by law enforcement agencies to quickly search the past history of suspects or criminals. In this application, days or weeks' worth of videos need to be processed within few minutes or hours, so that the required information can be made available as soon as possible, to speed up the investigation process. As a first step towards analyzing these videos, they have to be transferred very quickly for the processing to begin. Next, as the video file processing is on-going and intermediate results are ready, they are continuously made available as soon as possible for further investigative actions. This makes it a bandwidth-sensitive application, as the video file transfer depends on the available upload bandwidth and continuous reception of results depends on the available download bandwidth.

Figure 2:
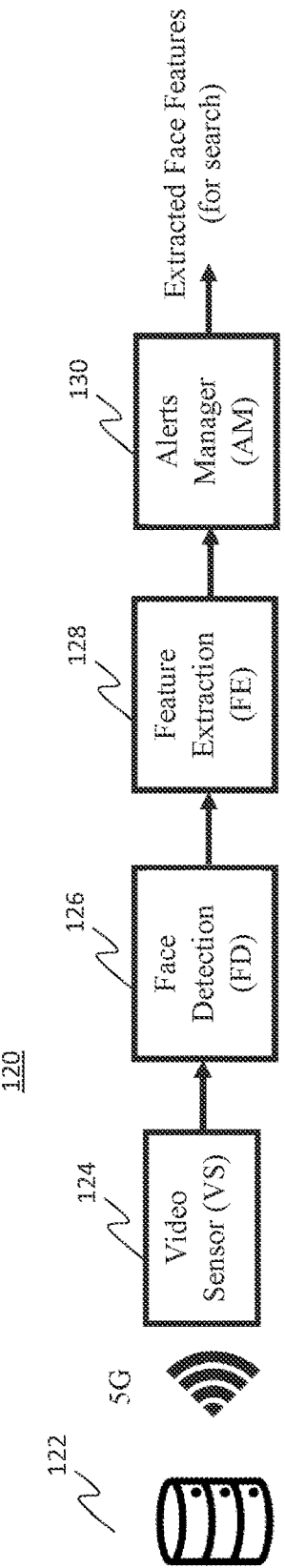
FIG. 2 is a block/flow diagram of an exemplary investigation and forensics application pipeline, in accordance with embodiments of the present invention.
Figure 3:
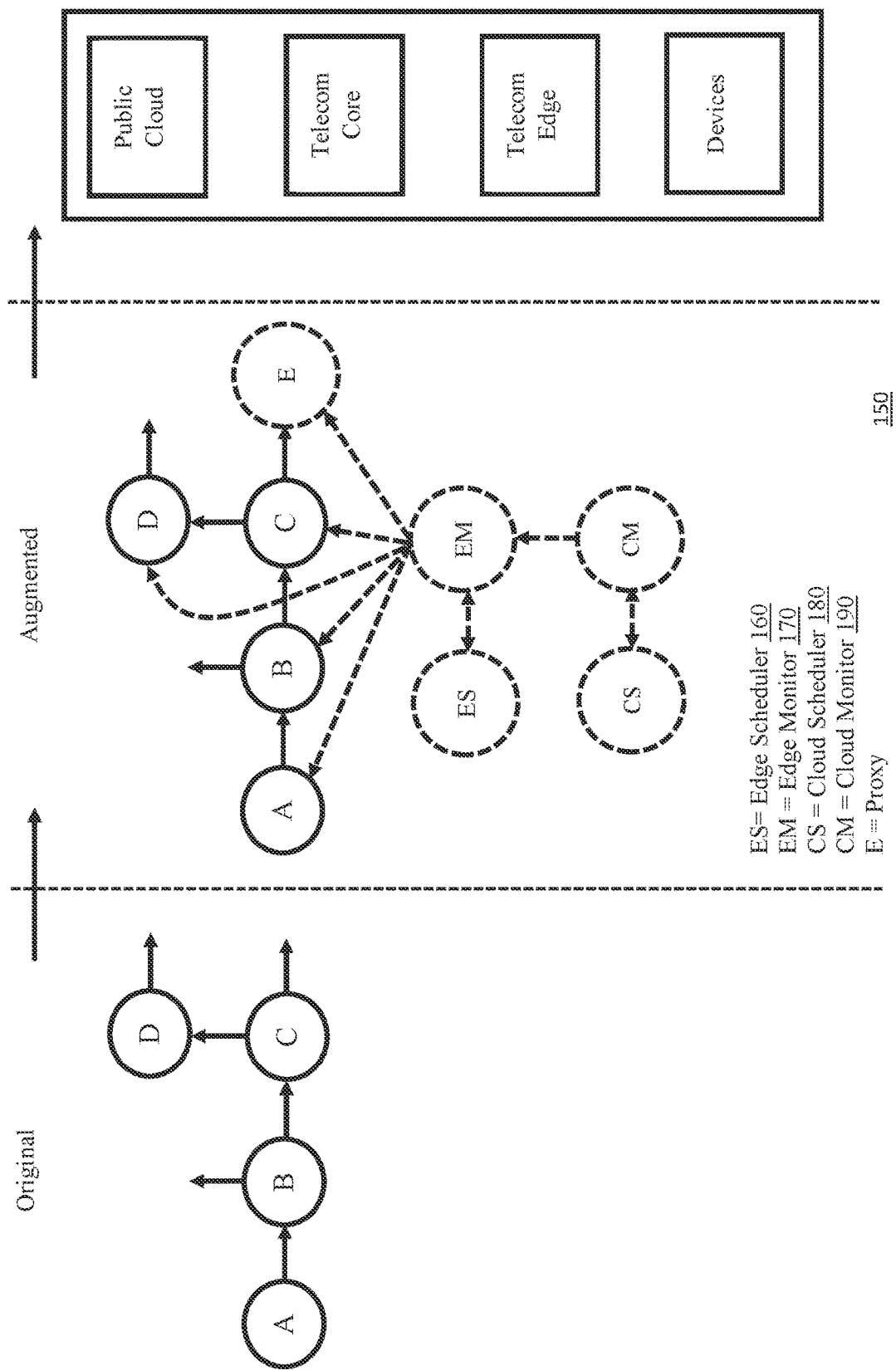
FIG. 3 is a block/flow diagram of an exemplary edge-cloud optimization (ECO) architecture, in accordance with embodiments of the present invention.

Regarding investigation and forensics, and specifically with respect to application as microservices, FIG. 2 shows the various microservices 120 involved in this application and how they are chained together. The video files 122 are read by Video Sensor (VS) microservice 124 and frames from these files are made available for further processing. It is noted that VS 124 can split files and make frames available in batches as well. These frames are then processed by Face Detection (FD) microservices 126 followed by Feature Extraction (FE) microservices 128 to detect faces and extract unique facial feature templates. These extracted features are then made available for search through Alerts Manager (AM) microservice 130. As the frames from files are processed, rather than waiting till the entire processing is complete, the extracted face features are immediately made available as intermediate results, so that investigative actions can be taken quickly.

FIG. 2 also shows the pipeline of microservices that determine the response latency of the application, from measurement (e.g., receipt of a video file) to action (e.g., when faces are made available as they are extracted). As part of the specification of the application, the programming model also knows the acceptable response latencies for the pipelines.

Applications can be mapped to an edge-cloud infrastructure in different ways, yielding different response latencies and incurring different costs. Microservices are packaged as docker images, and they run as docker containers in a third-party orchestration framework such as Kubernetes. Microservices are deployed from the cloud using the Enhanced Video Analytics (EVA) platform.

To address the challenges posed by conventional distributed architectures, such as a hybrid deployment of microservices across the cloud and edge infrastructure, the exemplary embodiments introduce four new components at the edge, that is, an Edge Monitor (EM), an Edge Scheduler (ES), an Alerts-Manager at Edge (AME) and a File Transfer (FT). These are new microservices that were not part of the original application.

Regarding the conventional hybrid deployment of microservices across the cloud and edge infrastructure, this partitioning of microservices reduces cost, but it comes with its own challenges (a) how to partition the application components so that end-to-end latency is within acceptable limits, (b) how to dynamically adapt to changing environmental conditions (e.g. change in application input, change in network performance, etc.), and (c) how to seamlessly handle communication between devices, edge and cloud if the network is temporarily partitioned.

In the exemplary embodiments, EM and ES together handle challenges (a) and (b), while AM-E and FT handle challenge (c). These four new microservices are part of the run-time for the edge-cloud. Telemetry from EM is used by ES to make dynamic decisions about the placement of microservices in the distributed infrastructure hierarchy. ES is also aware of the latency-critical pipelines, and their aggregate response latency goals. AM-E microservice is a proxy for alerts-manager microservice at the edge. Internal connection to alerts-manager is transparently handled by introducing AM-E in the application pipeline to manage alerts at the edge. Similar to AM-E, FT is transparently introduced in the application pipeline. FT aids in transferring files between microservices, e.g., required in investigation and forensics application.

Regarding the Edge Monitor (EM), this microservice continuously monitors application-level as well as network-level performance metrics, which are used by the Edge Scheduler (ES) for making scheduling decisions. Each microservice is instrumented to report key metrics related to the service, including processing rate, e.g., number of tuples processed per second, input data rate and output data rate. These metrics are collected by EM for all the running microservices and made available to ES. Along with these application-specific metrics, EM also continuously monitors the network metrics, including latency, upload bandwidth and download bandwidth between the edge and the cloud. Standard network monitoring tools are used to measure network performance. EM internally maintains an adjustable window and smoothens the various collected metrics within the window to account for intermittent spurious measurements. At any given point in time, EM has the latest performance numbers for all the running microservices and the current network conditions, which is key for making proper scheduling decisions by ES.

The Edge Scheduler (ES) manages scheduling decisions at the edge, e.g., how to partition and schedule application components between the edge and the cloud. These decisions are made (a) statically e.g., at the start of the application and (b) dynamically e.g., while the application is running. Each application is a set of microservices, which are chained together in some manner to form a topology. This topology can be considered as a directed acyclic graph $G=(V, E)$, where the set of vertices $V=(v_1, v_2, \ldots, v_n)$ denotes the microservices and edge $e(v_i, v_j) \in E$ represents the communication between neighboring microservices $v_i$ and $v_j$, where $v_i$ and $v_j$ are neighbors. Each vertex $v \in V$ is assigned with two cost weights $w(v)^{edge}$ and $w(v)^{cloud}$, which are the cost of running the microservice on the edge and the cloud, respectively. The cost of running microservice v in the edge is given by Equation 1 and the cost of running in the cloud is given by Equation 2.

$$w(v)^{edge} = T_v^{edge} * P_v^{edge} \tag{1}$$

$$w(v)^{cloud} = T_v^{cloud} * P_v^{cloud} \tag{2}$$

where $T_v$ is the execution time of microservice $v$ on the edge, $P_v^{edge}$ is the price (AWS cost) of running the microservice on the edge, $T_v^{cloud}$ is the execution time of the microservice on the cloud and $P_v^{cloud}$ is the price (AWS cost) of running the microservice in the cloud. It is noted that some microservices cannot be offloaded to the cloud and have to remain on the edge, e.g., microservices that receive input from devices in the carrier network and those that deliver output to devices in the carrier network. Such microservices are fixed to the edge and they only have an edge cost.

Each vertex receives one of the two weights depending on where it is scheduled to run, e.g., it will get weight $w(v)^{edge}$ if it is scheduled to run on the edge or $w(v)^{cloud}$ if it is scheduled to run on the cloud. Each edge $e(v_i, v_j) \in E$ represents the communication between $v_i$ and $v_j$, where $v_i$ is on the edge and $v_j$ is on the cloud (or vice versa), and this edge is assigned a weight given by Equation 3:

$$w(e(v_i, v_j)) = \frac{data\_in_{i,j}}{bw_{upload}} + \frac{data\_out_{i,j}}{bw_{download}} \quad (3)$$

where $data\_in_{i,j}$ is the amount of data transferred (uploaded) from $v_i$ to $v_j$, $data\_out_{i,j}$ is the amount of data received (downloaded) from $v_j$ to $v_i$, $bw_{upload}$ is the network upload bandwidth and $bw_{download}$ is the network download bandwidth between edge and cloud.

The total latency for the application is the end-to-end time for processing a unit of work. This total latency depends on the time taken by the microservices in the critical path in the application. This critical path is provided to the system and based on this, the total latency is given by Equation 4:

$$\begin{aligned} L_{total} &= \sum_{v \in V} F_v \times T_v^{edge} \quad \text{(Edge latency)} \quad (4) \\ &+ \sum_{v \in V} (1 - F_v) \times T_v^{cloud} \quad \text{(Cloud latency)} \\ &+ \sum_{e(v_i, v_j) \in E} F_e \times w(e(v_i, v_j)) \quad (Comm^n \text{ latency}) \end{aligned}$$

where the total latency is the sum of the edge latency, e.g., processing time taken by microservices on the edge for a unit of work, cloud latency, e.g., processing time taken by microservices on the cloud for a unit of work and communication latency, e.g., time taken for data transfer between the edge and the cloud. Flags $F_v$ and $F_e$ in Equation 4 are defined as follows:

$$F_v = \begin{cases} 1, & \text{if } v \in V^{edge} \\ 0, & \text{othrwise} \end{cases} \text{ and } F_e = \begin{cases} 1, & \text{if } e \in E_{cut} \\ 0, & \text{if } e \notin E_{cut} \end{cases} \quad (5)$$

where $V^{edge}$ is the set of vertices (microservices) scheduled to run on the edge and $E_{cut}$ is the set of edges $e(v_1, v_j)$ in which $v_i$ and $v_j$ are scheduled on the edge and cloud, or vice versa.

The exemplary methods formulate the total cost given by Equation 6:

$$\begin{aligned} Cost_{total} &= c_{edge} \times \sum_{v \in V} F_v \times w(v)^{edge} \quad \text{(Edge cost)} \quad (6) \\ &+ c_{cloud} \times \sum_{v \in V} (1 - F_v) \times w(v)^{cloud} \quad \text{(Cloud cost)} \end{aligned}$$

where the total cost is the sum of the edge computation cost and cloud computation cost, and weight parameters $c_{edge}$ and $c_{cloud}$ are to adjust the relative importance between them.

The goal of partitioning is to find a cut in the graph G=(V, E) with a minimum total cost under given total latency constraint per unit of work. This latency constraint is provided to the system, and ES adheres to this constraint while determining the cut in the graph. This cut separates the graph into two disjoint sets, where one side of the cut is scheduled on the edge while the other side is scheduled on the cloud, such that the overall cost of application execution is reduced, while keeping the end-to-end latency within the provided total latency constraint. Since the cost of virtual machine (VM) in the cloud is lower than that on the edge (Wavelength in this case) for the same or better VMs in the cloud, scheduling microservices on the cloud will certainly help reduce the overall cost. However, if the time for data transfer between microservices scheduled on the cloud and the edge is high, then the end-to-end latency will go up, which is not desirable. The above formulation helps in obtaining a desired partition which reduces the overall cost, while keeping end-to-end latency within an acceptable limit.

In scenarios where there are multiple layers of computing infrastructure available, such that the cost reduces as you go to upper layers at the expense of increased latency, the same method can be applied iteratively across layers to identify the appropriate allocation and scheduling of microservices. For example, it is assumed that there are three computing layers A, B and C, with A being at the top, B in the middle and C at the bottom. The cost of computing goes lower as you go up from C to A, while the latency goes higher as you go up from C to A. In this scenario, the above partitioning scheme will first consider A as the cloud, and B and C together will be considered as the edge. Once this partition is determined, certain microservices will be scheduled to run on A, while others will be scheduled to run on B and C. For the ones that are scheduled to run on B and C, only for those microservices, the partitioning scheme will be applied again. This time B is considered as the cloud and C as the edge. The set of microservices will now be split to run between B and C. This way, the various microservices will be allocated and scheduled to run on layers A, B and C. This iterative process can be extended to any number of computing layers and appropriate partitioning of microservices can be determined across these various layers.

Before the execution of the application starts, based on application and network parameters, e.g., the current network condition, and apriori knowledge about execution times and communication across various microservices of the application, the above partitioning scheme is used by ES to decide where to schedule the various microservices. After the application starts running, ES continuously receives application-level and network-level performance data from EM. This is used to periodically check if the previously selected partition is still good or needs to be adjusted dynamically based on the changing environmental (application-level and/or network-level) conditions. Algorithm 1, reproduced below, shows the scheduling algorithm used by ES to schedule applications between the edge and the cloud.

At some pre-defined periodic interval, say 10 seconds, all applications are checked for making scheduling decisions. If the application is not already scheduled, then appropriate application partitioning is determined and the application is scheduled to run as per the selected partition. For the applications that are already running, the environmental conditions, including application-level parameters (processing speed, input and output data exchange rate from microservices, etc.) and network-level parameters (latency, upload and download bandwidth between edge and cloud) are checked and if the change is over a pre-defined threshold for any of the parameters, then the same partitioning function is used with the latest updated parameters and the application is re-scheduled as per the newly determined partition scheme.

```
Algorithm 1 Application scheduling
 1:    while true do
 2:        for app ∈ apps do
 3:            if !isAppScheduled(app) OR
 4:                conditionsChanged(app, a_p, n_p) then
 5:                partition ← getPartition(app, a_p, n_p)
 6:                scheduleApp(app, partition)
 7:            end if
 8:        end for
 9:        sleep(interval)
10:    end while
```

Regarding Alerts-Manager at Edge (AM-E), for low-latency response applications, alerts are usually generated at the edge, and persisted in the long-term store in the cloud.

Proxy microservices are introduced to deliver information quicker (in real-time) and also aid in handling network partition between a wavelength zone and an availability zone. As an example, for low-latency response applications, alerts are usually generated at the edge, and persisted in the long-term store in the cloud. In order to make the alerts available quickly (real-time) to other applications, the exemplary embodiments introduce a proxy microservice for AM in the cloud. This new microservice, called AM-E, receives alerts from application microservices, either locally on the edge or from the cloud and publishes them over a ZeroMQ channel immediately for other applications to consume. This proxy also maintains the received alerts in a temporary buffer, which is periodically synchronized with AM microservice's persistent storage in the cloud. AM-E is also useful if a network partition occurs. After the network connectivity is restored, the proxy synchronizes with AM microservice in the cloud by using lightweight application specific alerts. This is in stark contrast to an approach where databases on the edge in the Wavelength zone are synchronized with the persistent store in the cloud by using an order of magnitude more resources on the edge. AM-E is transparently added by the runtime in the application pipeline to ensure quick delivery of alerts from the edge to other applications or to devices in the carrier network. This is possible since the runtime has intrinsic knowledge of the application pipeline.

Regarding File Transfer (FT), for applications that work with files, when they reside completely on the edge or cloud, there is no need for an explicit component that manages and coordinates file transfer since all microservices are co-located. However, when microservices are split between the edge and the cloud, it becomes necessary to co-ordinate file transfer across the network and handle situations when there is network partition. FT handles such a scenario and similar to AM-E, FT is also transparently added by the runtime in the application pipeline to co-ordinate file transfer between microservices over the network. Again, this is only possible because the runtime has intrinsic knowledge of the entire application pipeline and can introduce FT. Measurements from FT regarding the progress of file transfer, speed, etc. is used by EM to keep track of application and network performance, which is used by ES to make dynamic application placement decisions.

Figure 4:
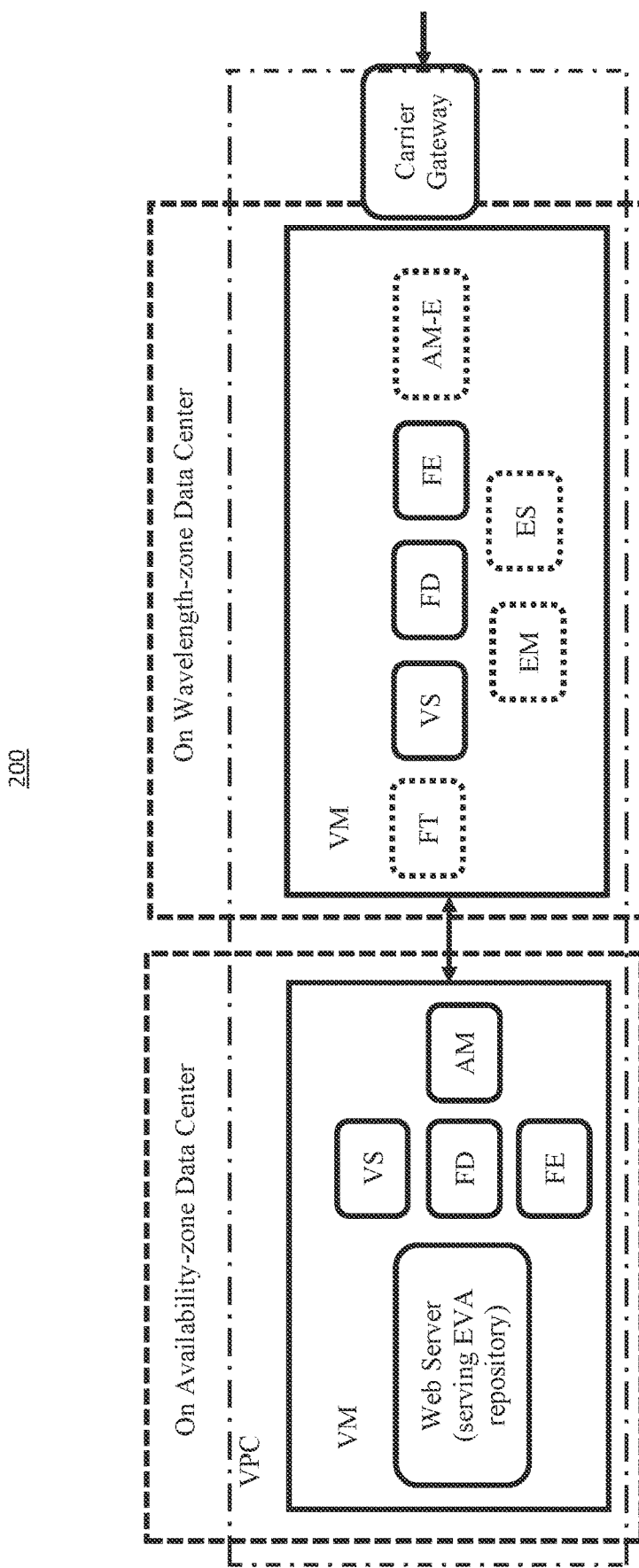
FIG. 4 is a block/flow diagram of an exemplary hybrid deployment of forensics application, in accordance with embodiments of the present invention.

FIG. 4 shows hybrid deployment of investigation and forensics application 200, where components are distributed between the edge and the cloud. While the processing at the edge continues, resources from the cloud are also leveraged to process parts of the files in parallel. For this, the file transfer co-ordination is handled by FT at the edge. FT also keeps track of which parts of the files are transferred, which ones are in progress, which ones are complete, etc. In case of network partition, the ones that were in progress on the cloud are re-initiated on the edge by FT.

Regarding Cloud Monitor (CM), the Edge Monitor, described above, monitors application-level and network-level performance metrics at individual edge, while CM monitors and maintains this information from multiple edges, at a central location in the cloud. CM thus has a global view, while EM has a local view of the state of deployment of various applications. CM works in conjunction with EMs and maintains key edge-level metrics from individual edges and makes them available for Cloud Scheduler (CS) to make decisions about placement of applications at appropriate edges. Each EM, at periodic intervals, reports edge-level metrics like health of the edge, performance of applications running on the edge, network performance between the edge and the cloud, etc., to CM, which then has the most up-to-date information from all the connected edges. If any of the edge loses connection due to network partitioning, then the information at CM from that edge is stale and subsequently CS avoids scheduling applications at that particular edge until network connection is restored. Alternatively, if the edge health seems to be unstable, then CM notes this and CS subsequently avoids scheduling applications on that edge until the edge health is back to normal.

Figure 6:
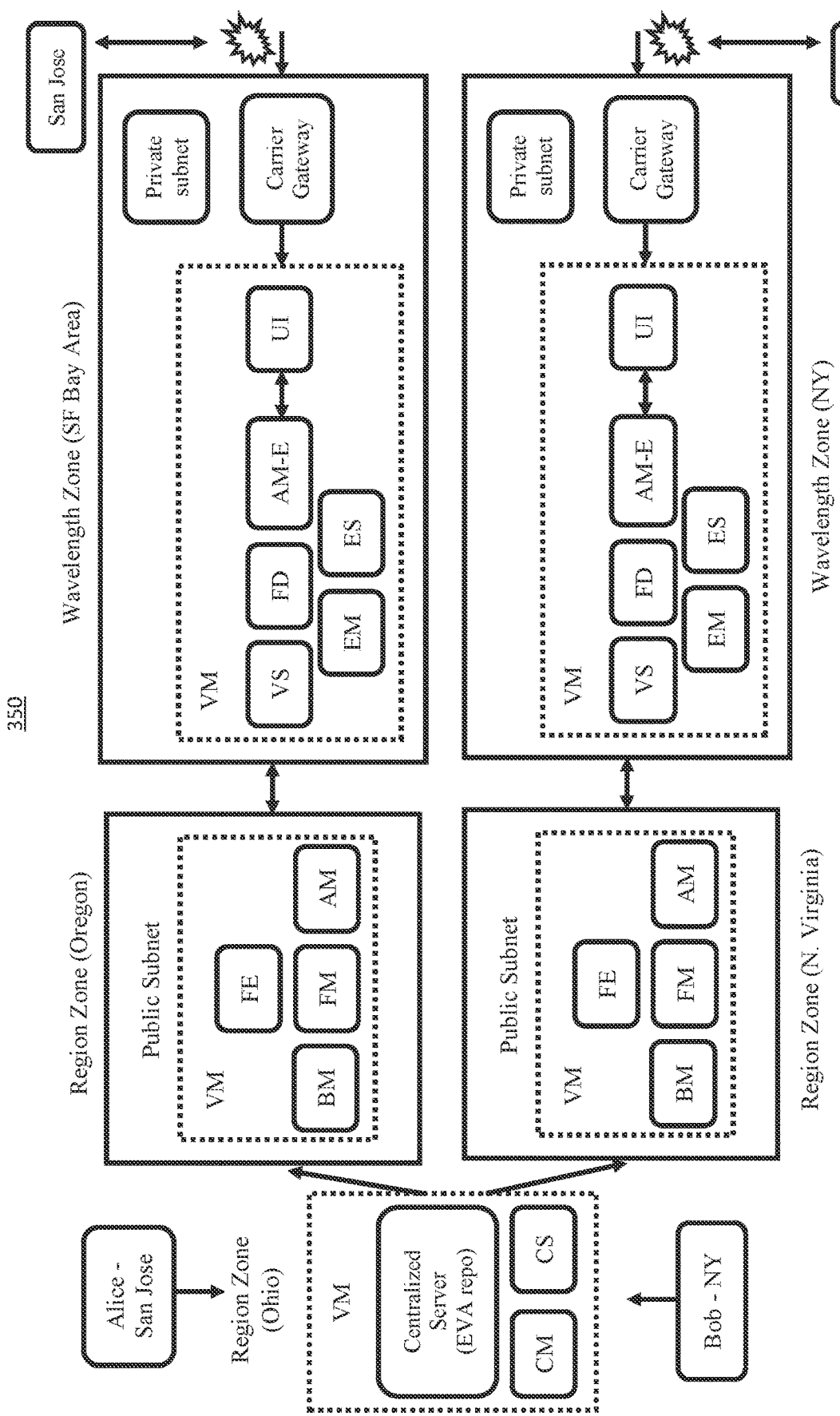
FIG. 6 is a block/flow diagram of an exemplary centralized application deployment, in accordance with embodiments of the present invention.

Cloud Scheduler (CS) enables deployment of applications across different Wavelength zones. CS enables deployment of applications in a distributed architecture, all from a central cloud. The exemplary methods use AWS Wavelength to explore edge-cloud solutions for 5G applications. These wavelength zones are geographically distributed across various regions and a Virtual Private Network (VPC) is setup such that the virtual machines in the cloud and virtual machines in the wavelength zones are in the same network and can talk to each other. FIG. 6 illustrates an AWS Wavelength infrastructure, where the Amazon Virtual Private Cloud (VPC) is extended to include the Wavelength Zone and supported EC2 instances are spawned in the Wavelength zone to handle latency sensitive application components. 5G devices in the carrier network connect to the Wavelength Zone through the carrier gateway and network traffic from these devices is directly routed to the VMs in Wavelength zone without leaving the carrier network. Once in Wavelength zone, data can be processed locally within the Wavelength zone for latency-sensitive components and less-latency sensitive components or components that need to be shared across zones or components that need to persist state, e.g., databases, can be run in the Availability zone.

Figure 5:
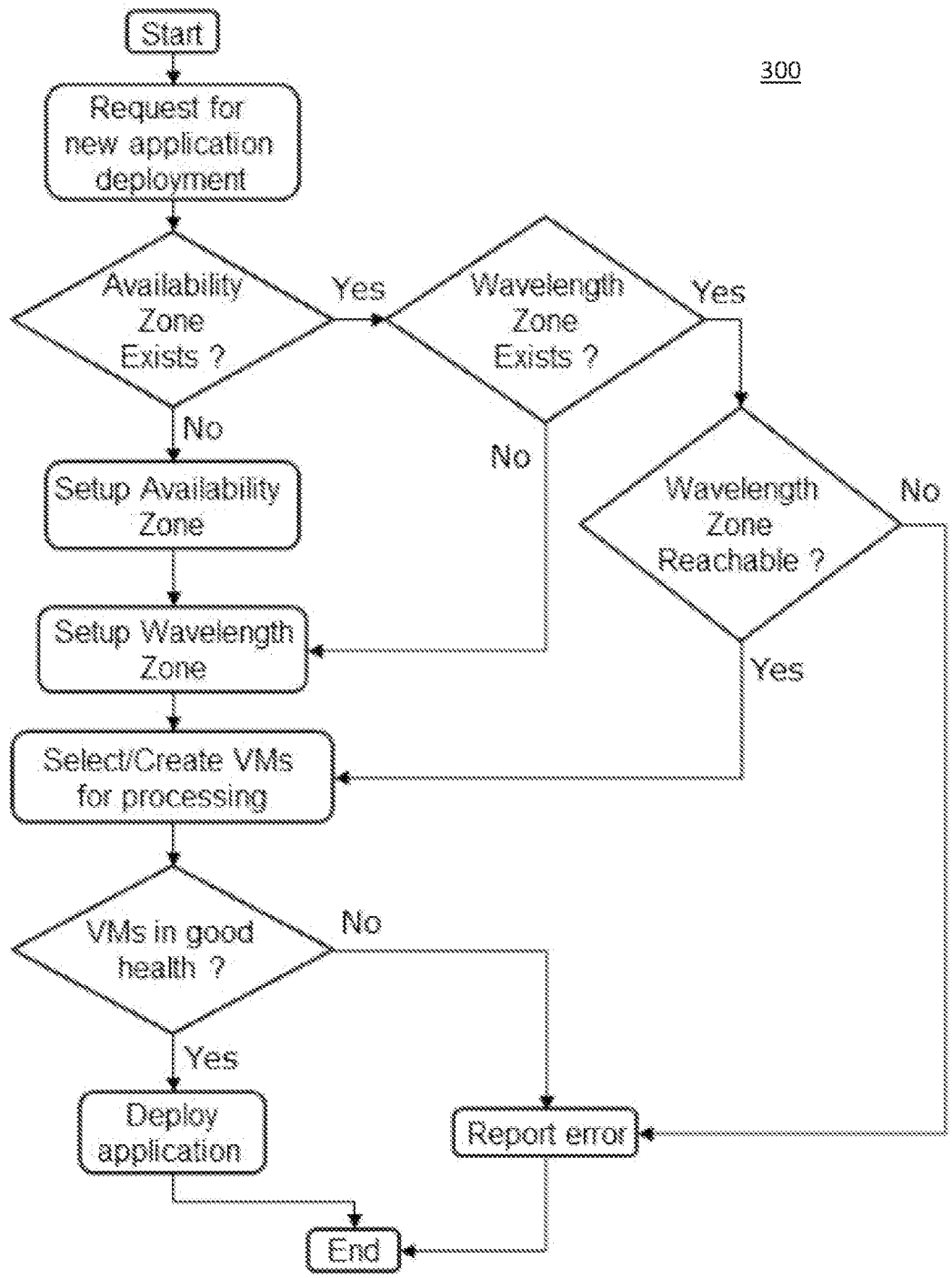
FIG. 5 is a flowchart of an exemplary cloud scheduler, in accordance with embodiments of the present invention.

FIG. 5 shows the flowchart 300 of the procedure followed by CS to serve a request for application deployment. Whenever a request to deploy a new application in a particular geographical region is received, CS first checks if there already exists an availability and wavelength zone setup for that region. If not, then a new VPC is created and availability and wavelength zone for the corresponding geographical region is set up. If a Wavelength zone is already set up and is reachable (checked using data from CM), then it is selected for deployment of the application. After Wavelength zone, next is the selection or creation of VMs for application processing. If existing VMs can accommodate microservices of the application (checked using data from CM) then they are selected and if more VMs are needed for processing the application, then new VMs are created within the availability and wavelength zone. The health of these VMs is then checked using edge-level metrics from CM and if they look good, then application is deployed on these VMs and the request processing ends. If either the existing Wavelength zone is not reachable or the VMs are not in good health, an error is reported and request processing ends.

In conclusion, the exemplary embodiments describe a new programming model and run-time that enables such applications to make effective use of a 5G network, computing at the edge of this network, and resources in the centralized cloud. The new programming model captures the internal knowledge about the application's microservices, their interconnections, and the microservices pipelines that determine the response latency of the application. Then, the run-time continuously monitors the interaction among the microservices, estimates the data produced and exchanged among the microservices, and uses a graph min-cut algorithm to dynamically map the microservices to the edge or the cloud to satisfy application-specific response times. The run-time also handles temporary network partitions and maintains data consistency across the distributed fabric or framework by using microservice proxies to reduce WAN bandwidth by an order of magnitude, all in an application-specific manner by leveraging knowledge about the application's functions, latency critical pipelines and intermediate data.

Moreover, the exemplary embodiments introduce:

System and methods to optimally place various microservices of a microservices-based application in a multi-tiered computing fabric. System and methods to reduce overall cost of application deployment, while keeping the end-to-end latency within the provided total latency constraint. System and methods to capture internal knowledge about the application's microservices, their interconnections, and the microservices pipelines that determine the response latency of the application and leverage it within a runtime to meet application requirements. System and methods to model application as a graph with vertices being microservices and edges representing communication between microservices. System and methods to determine total end-to-end latency for the application, including time to run various microservices and time for data communication between them. System and methods to determine total cost of running the application in multi-tiered computing fabric or framework.

System and methods to determine a partition/cut in the graph, which separates the microservices into two disjoint sets, where one side of the partition/cut is scheduled on the edge while the other side is scheduled on the cloud. System and methods to iteratively apply a partitioning scheme to allocate and schedule microservices to various layers in a multi-layered computing fabric. System and methods to dynamically monitor application's microservices and determine optimal placement based on the current application and network conditions. System and methods to deploy application in a distributed architecture from a central cloud. System and methods to automatically identify appropriate geographical locations for application deployment. System and methods to handle network partition between wavelength and availability zones by introducing a proxy. System and methods to deliver information quicker (in real-time) by introducing a proxy at the edge. System and methods to apply the programming model and runtime for video analytics applications.

FIG. 6 is a block/flow diagram of an exemplary centralized application deployment 350, in accordance with embodiments of the present invention.

The distributed architecture 350 handles deployments across different Wavelength zones, all from a centralized cloud. Users access a central site, and request for a set of services to be deployed on a collection of sensors. For example, in in FIG. 6, Alice from the San Jose area contacts a VM in the Ohio Region zone, expressing an interest to start a particular application on a camera A. In response to the request, the exemplary methods create a VPC with appropriate Region and Wavelength zones for customers in the San Jose area. Then, the carrier gateway IP address, as well as the public IP address of the VM in the Oregon Region zone is sent back to Alice as a React program, which points camera A to the carrier gateway IP address, and the service is now available on camera A. Similarly, when Bob from New York wants to start a particular application on his camera B, he visits the central site in the Ohio Region zone and makes a request for a particular application on camera B. In response, the exemplary methods create another VPC with resources in the North Virginia Region zone and a Wavelength zone in New York. Bob's camera B connects to the carrier gateway IP address for the Wavelength zone in New York, and avails the requested application. The system can quickly set up such a global application service, without any human involvement.

Figure 7:
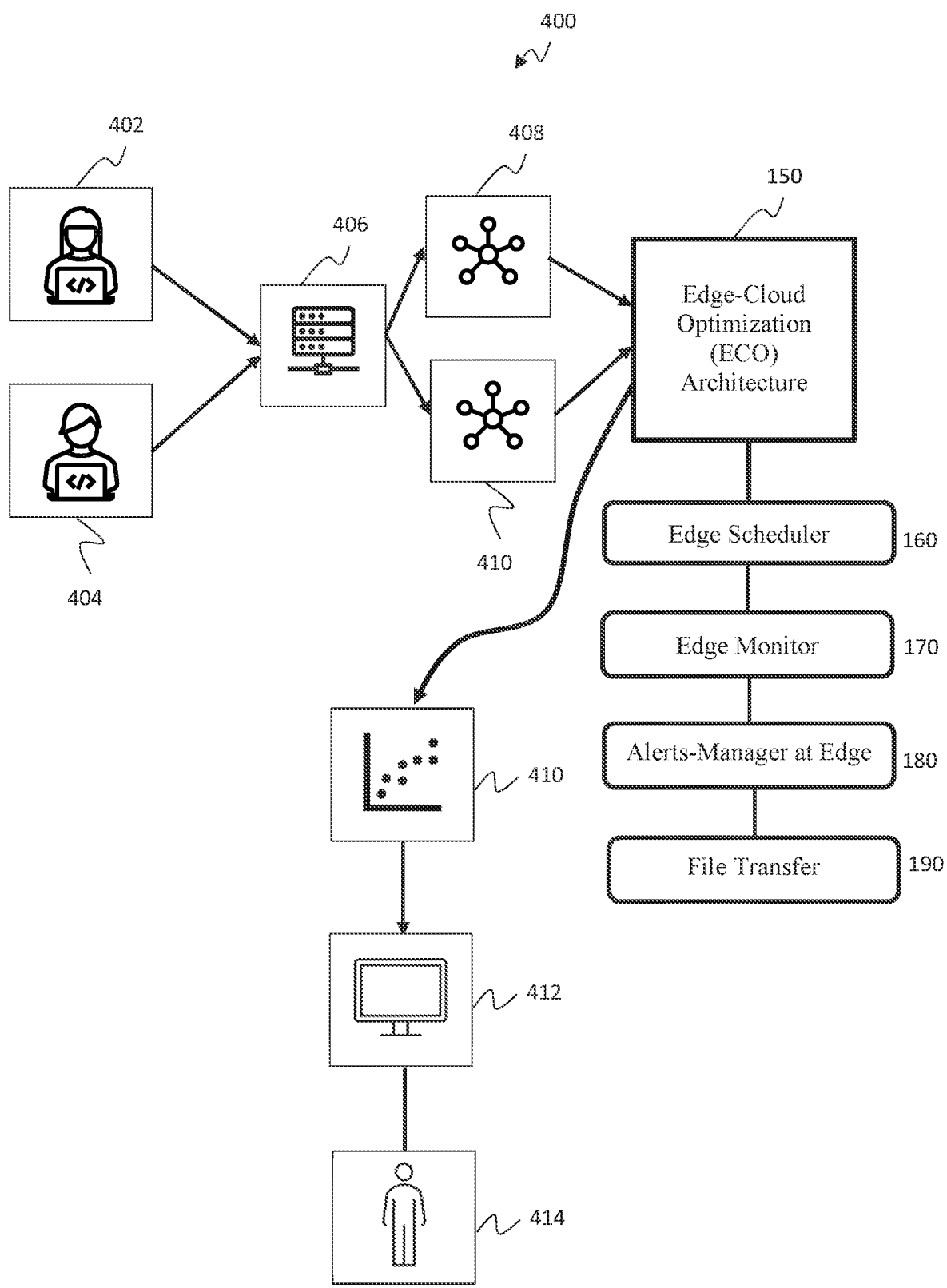
FIG. 7 is an exemplary practical application for optimal placement of microservices of a micro-services-based application in a multi-tiered computing network environment, in accordance with embodiments of the present invention.

FIG. 7 is a block/flow diagram 400 of a practical application for optimal placement of microservices of a microservices-based application in a multi-tiered computing network environment, in accordance with embodiments of the present invention.

In one practical example, one or more users 402, 404 access a centralized server or cloud 406, which communicates with VPC 408 (for user 402) and communicates with VPC 410 (for user 404). The VPCs 408, 410 employ the edge-cloud optimization (ECO) architecture 150 including an edge scheduler microservice 160, an edge monitor microservice 170, an alerts-manager at edge microservice 180, and a file transfer microservice 190. The results 410 (dynamical mapping of microservices) can be provided or displayed on a user interface 412 handled by a user 414.

Figure 8:
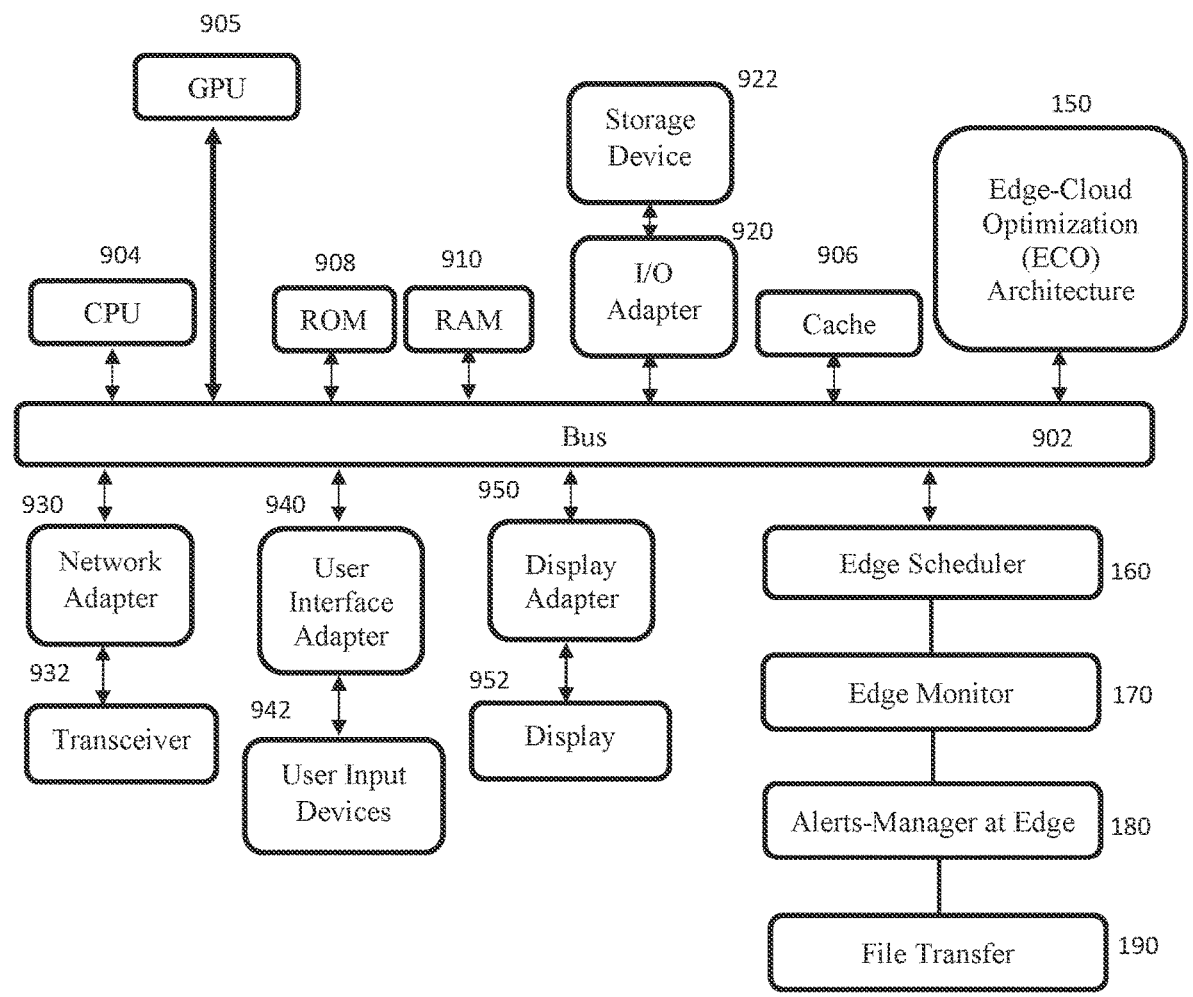
FIG. 8 is an exemplary processing system for optimal placement of microservices of a micro-services-based application in a multi-tiered computing network environment, in accordance with embodiments of the present invention.

FIG. 8 is an exemplary processing system for optimal placement of microservices of a micro-services-based application in a multi-tiered computing network environment, in accordance with embodiments of the present invention.

The processing system includes at least one processor (CPU) 904 operatively coupled to other components via a system bus 902. A GPU 905, a cache 906, a Read Only Memory (ROM) 908, a Random Access Memory (RAM) 910, an input/output (I/O) adapter 920, a network adapter 930, a user interface adapter 940, and a display adapter 950, are operatively coupled to the system bus 902. Additionally, the exemplary embodiments employ an edge-cloud optimization (ECO) architecture 150 including an edge scheduler microservice 160, an edge monitor microservice 170, an alerts-manager at edge microservice 180, and a file transfer microservice 190.

A storage device 922 is operatively coupled to system bus 902 by the I/O adapter 920. The storage device 922 can be any of a disk storage device (e.g., a magnetic or optical disk storage device), a solid-state magnetic device, and so forth.

A transceiver 932 is operatively coupled to system bus 902 by network adapter 930.

User input devices 942 are operatively coupled to system bus 902 by user interface adapter 940. The user input devices 942 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 942 can be the same type of user input device or different types of user input devices. The user input devices 942 are used to input and output information to and from the processing system.

A display device 952 is operatively coupled to system bus 902 by display adapter 950.

Of course, the processing system may also include other elements (not shown), as readily contemplated by one of skill in the art, as well as omit certain elements. For example, various other input devices and/or output devices can be included in the system, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system are readily contemplated by one of ordinary skill in the art given the teachings of the present invention provided herein.

Figure 9:
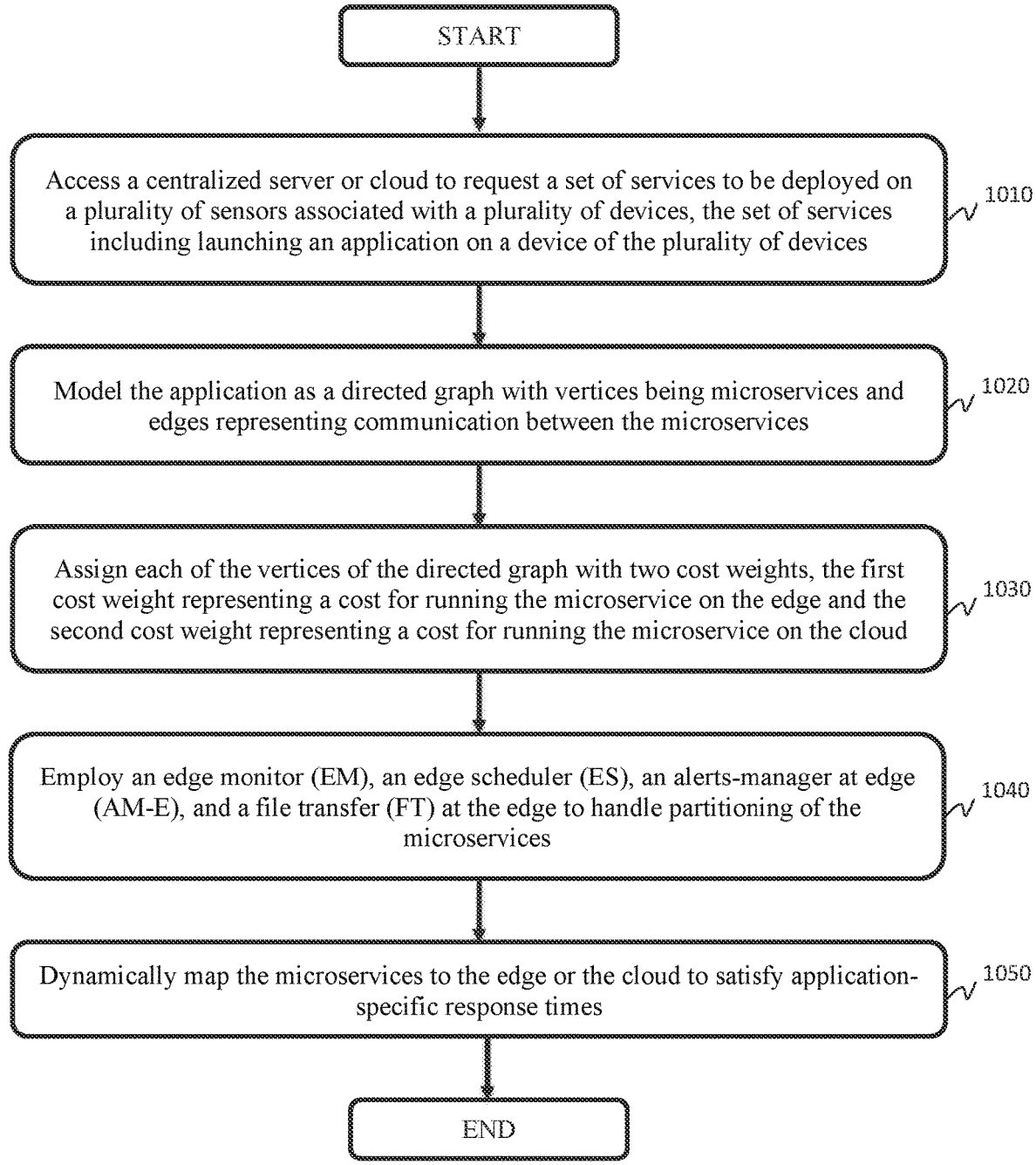
FIG. 9 is a block/flow diagram of an exemplary method for optimal placement of microservices of a micro-services-based application in a multi-tiered computing network environment, in accordance with embodiments of the present invention.

FIG. 9 is a block/flow diagram of an exemplary method for optimal placement of microservices of a micro-services-based application in a multi-tiered computing network environment, in accordance with embodiments of the present invention.

At block 1010, access a centralized server or cloud to request a set of services to be deployed on a plurality of sensors associated with a plurality of devices, the set of services including launching an application on a device of the plurality of devices.

At block 1020, model the application as a directed graph with vertices being microservices and edges representing communication between the microservices.

At block 1030, assign each of the vertices of the directed graph with two cost weights, the first cost weight representing a cost for running the microservice on the edge and the second cost weight representing a cost for running the microservice on the cloud.

At block 1040, employ an edge monitor (EM), an edge scheduler (ES), an alerts-manager at edge (AM-E), and a file transfer (FT) at the edge to handle partitioning of the microservices.

At block 1050, dynamically map the microservices to the edge or the cloud to satisfy application-specific response times.

As used herein, the terms "data," "content," "information" and similar terms can be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, the data can be received directly from the another computing device or can be received indirectly via one or more intermediary computing devices, such as, for example, one or more servers, relays, routers, network access points, base stations, and/or the like. Similarly, where a computing device is described herein to send data to another computing device, the data can be sent directly to the another computing device or can be sent indirectly via one or more intermediary computing devices, such as, for example, one or more servers, relays, routers, network access points, base stations, and/or the like.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," "calculator," "device," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can include, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks or modules.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks or modules.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for optimal placement of microservices of a micro-services-based application in a multi-tiered computing network environment employing 5G technology, the method comprising:
    accessing a centralized server or cloud to request a set of services to be deployed on a plurality of sensors associated with a plurality of devices, the set of services including launching an application on a device of the plurality of devices;
    modeling the application as a directed graph with vertices being microservices and edges representing communication between the microservices;
    assigning each of the vertices of the directed graph with two cost weights, the first cost weight representing a cost for running the microservice on the edge and the second cost weight representing a cost for running the microservice on the cloud;
    employing an edge monitor (EM), an edge scheduler (ES), an alerts-manager at edge (AM-E), and a file transfer (FT) at the edge to handle partitioning of the microservices; and
    dynamically mapping the microservices to the edge or the cloud to satisfy application-specific response times;
    wherein a total latency is given by:

$$L_{total} = \sum_{v \in V} F_v \times T_v^{edge}$$
$$+ \sum_{v \in V} (1 - F_v) \times T_v^{cloud}$$
$$+ \sum_{e(v_i, v_j) \in E} F_e \times w(e(v_i, v_j))$$

where the total latency is a sum of an edge latency, a cloud latency, and a communication latency, and where $T_v^{edge}$ is an execution time of microservice $v$ on the edge, $T_v^{cloud}$ is an execution time of the microservice $v$ on the cloud, $F_v$ and $F_e$ are flags, $v_i$ and $v_j$ are neighboring microservices, and $w(e(v_i,v_j))$ is the communication latency, and where the total latency depends on a time taken by the microservices in a critical path,
wherein the flags are defined as:

$$F_v = \begin{cases} 1, & \text{if } v \in V^{edge} \\ 0, & \text{othrwise} \end{cases} \text{ and } F_e = \begin{cases} 1, & \text{if } e \in E_{cut} \\ 0, & \text{if } e \notin E_{cut} \end{cases}$$

where $V^{edge}$ is a set of vertices scheduled to run on the edge and $E_{cut}$ is a set of edges $e(v_i,v_j)$ in which $v_i$ and $v_j$ are scheduled on the edge and cloud, or vice versa.

2. The method of claim 1, wherein the EM continuously monitors application-level and network-level performance metrics used by the ES to make scheduling decisions, and EM internally maintains an adjustable window to smooth collected metrics within the adjustable window to account for intermittent spurious measurements.

3. The method of claim 1, wherein the ES manages scheduling decisions at the edge, such as how to partition and schedule application components between the edge and the cloud.

4. The method of claim 1, wherein the ES determines a partition in the directed graph, the partition separating the directed graph into two disjoint sets, where one side of the partition is scheduled on the edge while the other side of the partition is scheduled on the cloud.

5. The method of claim 1, wherein communication latency is given by:

$$w(e(v_i, v_j)) = \frac{\text{data\_in}_{i,j}}{bw_{upload}} + \frac{\text{data\_out}_{i,j}}{bw_{download}}$$

where $\text{data\_in}_{i,j}$ is an amount of data uploaded from $v_i$ to $v_j$, $\text{data\_out}_{i,j}$ is an amount of data downloaded from $v_j$ to $v_i$, $bw_{upload}$ is a network upload bandwidth, $bw_{download}$ is a network download bandwidth between edge and cloud, and $v_i$ and $v_j$ are neighboring microservices.

6. The method of claim 1, wherein a total cost is given by:

$$Cost_{total} = c_{edge} \times \sum_{v \in V} F_v \times w(v)^{edge}$$
$$+ c_{cloud} \times \sum_{v \in V} (1 - F_v) \times w(v)^{cloud}$$

where the total cost is a sum of an edge computation cost and a cloud computation cost, and weight parameters $c_{edge}$ and $c_{cloud}$ are used to adjust relative importance between them.

7. The method of claim 1, wherein the AM-E receives alerts from application microservices, either locally on the edge or from the cloud, and publishes the alerts over a ZeroMQ channel for other applications to consume.

8. The method of claim 1, wherein a cloud monitor (CM) and a cloud scheduler (CS) communicate with the EM and the ES, the CM monitoring and maintaining application-level and network-level performance metrics from multiple edges at a central location in the cloud and the CS enabling deployment of the application across different wavelength zones.

9. A non-transitory computer-readable storage medium comprising a computer-readable program for optimal placement of microservices of a micro-services-based application in a multi-tiered computing network environment employing 5G technology, wherein the computer-readable program when executed on a computer causes the computer to perform the steps of:
accessing a centralized server or cloud to request a set of services to be deployed on a plurality of sensors associated with a plurality of devices, the set of services including launching an application on a device of the plurality of devices;
modeling the application as a directed graph with vertices being microservices and edges representing communication between the microservices;
assigning each of the vertices of the directed graph with two cost weights, the first cost weight representing a cost for running the microservice on the edge and the second cost weight representing a cost for running the microservice on the cloud;
employing an edge monitor (EM), an edge scheduler (ES), an alerts-manager at edge (AM-E), and a file transfer (FT) at the edge to handle partitioning of the microservices; and
dynamically mapping the microservices to the edge or the cloud to satisfy application-specific response times;

wherein a total latency is given by:

$$L_{total} = \sum_{v \in V} F_v \times T_v^{edge}$$
$$+ \sum_{v \in V} (1 - F_v) \times T_v^{cloud}$$
$$+ \sum_{e(v_i,v_j) \in E} F_e \times w(e(v_i, v_j))$$

where the total latency is a sum of an edge latency, a cloud latency, and a communication latency, and where $T_v^{edge}$ is an execution time of microservice $v$ on the edge, $T_v^{cloud}$ is an execution time of the microservice $v$ on the cloud, $F_v$ and $F_e$ are flags, $v_i$ and $v_j$ are neighboring microservices, and $w(e(v_i, v_j))$ is the communication latency, and where the total latency depends on a time taken by the microservices in a critical path,
wherein the flags are defined as:

$$F_v = \begin{cases} 1, & \text{if } v \in V^{edge} \\ 0, & \text{othrwise} \end{cases} \text{ and } F_e = \begin{cases} 1, & \text{if } e \in E_{cut} \\ 0, & \text{if } e \notin E_{cut} \end{cases}$$

where $V^{edge}$ is a set of vertices scheduled to run on the edge and $E_{cut}$ is a set of edges $e(v_i, v_j)$ in which $v_i$ and $v_j$ are scheduled on the edge and cloud, or vice versa.

10. The non-transitory computer-readable storage medium of claim 9, wherein the EM continuously monitors application-level and network-level performance metrics used by the ES to make scheduling decisions, and EM internally maintains an adjustable window to smooth collected metrics within the adjustable window to account for intermittent spurious measurements.

11. The non-transitory computer-readable storage medium of claim 9, wherein the ES manages scheduling decisions at the edge, such as how to partition and schedule application components between the edge and the cloud.

12. The non-transitory computer-readable storage medium of claim 9, wherein the ES determines a partition in the directed graph, the partition separating the directed graph into two disjoint sets, where one side of the partition is scheduled on the edge while the other side of the partition is scheduled on the cloud.

13. The non-transitory computer-readable storage medium of claim 9, wherein communication latency is given by:

$$w(e(v_i, v_j)) = \frac{\text{data\_in}_{i,j}}{bw_{upload}} + \frac{\text{data\_out}_{i,j}}{bw_{download}}$$

where $\text{data\_in}_{i,j}$ is an amount of data uploaded from $v_i$ to $v_j$, $\text{data\_out}_{i,j}$ is an amount of data downloaded from $v_j$ to $v_i$, $bw_{upload}$ is a network upload bandwidth, $bw_{download}$ is a network download bandwidth between edge and cloud, and $v_i$ and $v_j$ are neighboring microservices.

14. The non-transitory computer-readable storage medium of claim 9, wherein a total cost is given by:

$$Cost_{total} = c_{edge} \times \sum_{v \in V} F_v \times w(v)^{edge}$$

-continued $$+c_{cloud} \times \sum_{v \in V} (1 - F_v) \times w(v)^{cloud}$$

where the total cost is a sum of an edge computation cost and a cloud computation cost, and weight parameters $c_{edge}$ and $c_{cloud}$ are used to adjust relative importance between them.

15. The non-transitory computer-readable storage medium of claim 9, wherein the AM-E receives alerts from application microservices, either locally on the edge or from the cloud, and publishes the alerts over a ZeroMQ channel for other applications to consume.

16. The non-transitory computer-readable storage medium of claim 9, wherein a cloud monitor (CM) and a cloud scheduler (CS) communicate with the EM and the ES, the CM monitoring and maintaining application-level and network-level performance metrics from multiple edges at a central location in the cloud and the CS enabling deployment of the application across different wavelength zones.

17. A system for optimal placement of microservices of a micro-services-based application in a multi-tiered computing network environment employing 5G technology, the system comprising:
 a memory; and
 one or more processors in communication with the memory configured to:
  access a centralized server or cloud to request a set of services to be deployed on a plurality of sensors associated with a plurality of devices, the set of services including launching an application on a device of the plurality of devices;
  model the application as a directed graph with vertices being microservices and edges representing communication between the microservices;
  assign each of the vertices of the directed graph with two cost weights, the first cost weight representing a cost for running the microservice on the edge and the second cost weight representing a cost for running the microservice on the cloud;
  employ an edge monitor (EM), an edge scheduler (ES), an alerts-manager at edge (AM-E), and a file transfer (FT) at the edge to handle partitioning of the microservices; and
 dynamically map the microservices to the edge or the cloud to satisfy application-specific response times;
 wherein a total latency is given by:

$$L_{total} = \sum_{v \in V} F_v \times T_v^{edge} + \sum_{v \in V} (1 - F_v) \times T_v^{cloud} + \sum_{e(v_i, v_j) \in E} F_e \times w(e(v_i, v_j))$$

where the total latency is a sum of an edge latency, a cloud latency, and a communication latency, and where $T_v^{edge}$ is an execution time of microservice $v$ on the edge, $T_v^{cloud}$ is an execution time of the microservice $v$ on the cloud, $F_v$, and $F_e$ are flags, $v_i$ and $v_j$ are neighboring microservices, and $w(e(v_i,v_j))$ is the communication latency, and where the total latency depends on a time taken by the microservices in a critical path,
wherein the flags are defined as:

$$F_v = \begin{cases} 1, & \text{if } v \in V^{edge} \\ 0, & \text{otherwise} \end{cases} \text{ and } F_e = \begin{cases} 1, & \text{if } e \in E_{cut} \\ 0, & \text{if } e \notin E_{cut} \end{cases}$$

where $V^{edge}$ is a set of vertices scheduled to run on the edge and $E_{cut}$ is a set of edges $e(v_i,v_j)$ in which $v_i$ and $v_j$ are scheduled on the edge and cloud, or vice versa.

18. The system of claim 17, wherein the ES determines a partition in the directed graph, the partition separating the directed graph into two disjoint sets, where one side of the partition is scheduled on the edge while the other side of the partition is scheduled on the cloud.

* * * * *